United States Patent
Bonar et al.

(10) Patent No.: US 10,936,303 B2
(45) Date of Patent: *Mar. 2, 2021

(54) SECURE IOT DEVICE UPDATE

(71) Applicant: Microsoft Technology Licensing, LLC, Redmond, WA (US)

(72) Inventors: Adrian Bonar, Kenmore, WA (US); Reuben R. Olinsky, Seattle, WA (US); Sang Eun Kim, Bellevue, WA (US); Edmund B. Nightingale, Bellevue, WA (US); Thales de Carvalho, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/566,355

(22) Filed: Sep. 10, 2019

(65) Prior Publication Data
US 2020/0012492 A1    Jan. 9, 2020

Related U.S. Application Data

(63) Continuation of application No. 15/444,024, filed on Feb. 27, 2017, now Pat. No. 10,416,991.
(Continued)

(51) Int. Cl.
*G06F 8/658* (2018.01)
*H04L 29/08* (2006.01)
(Continued)

(52) U.S. Cl.
CPC .............. *G06F 8/658* (2018.02); *G06F 8/65* (2013.01); *G06F 21/50* (2013.01); *G06F 21/74* (2013.01);
(Continued)

(58) Field of Classification Search
CPC . G06F 8/65; G06F 8/658; G06F 21/50; G06F 21/74; H04L 67/12; H04L 67/34; H04W 4/70
(Continued)

(56) References Cited

U.S. PATENT DOCUMENTS 4,814,970 A * 3/1989 Barbagelata ........ G06F 13/4027
712/28
5,774,546 A * 6/1998 Handelman .......... G06Q 20/346
380/227
(Continued)

FOREIGN PATENT DOCUMENTS

WO    WO-2010057312 A1 * 5/2010 ......... G06F 12/1408

OTHER PUBLICATIONS

US 10,810,000 B2, 10/2020, Chen (withdrawn)*
(Continued)

*Primary Examiner* — Andrew M. Lyons
(74) *Attorney, Agent, or Firm* — Davin Chin; Chin IP, PLLC

(57) ABSTRACT

The disclosed technology is generally directed to updating of applications, firmware and/or other software on IoT devices. In one example of the technology, a request that is associated with a requested update is communicated from a normal world of a first application processor to a secure world of the first application processor. The secure world validates the requested update. Instructions associated with the validated update are communicated from the secure world to the normal world. Image requests are sent from the normal world to a cloud service for image binaries associated with the validated update. The secure world receives the requested image binaries from the cloud service. The secure world writes the received image binaries to memory, and validates the written image binaries.

20 Claims, 7 Drawing Sheets

Related U.S. Application Data

(60) Provisional application No. 62/434,308, filed on Dec. 14, 2016.

(51) Int. Cl.
*G06F 8/65* (2018.01)
*G06F 21/50* (2013.01)
*G06F 21/74* (2013.01)
*H04W 4/70* (2018.01)

(52) U.S. Cl.
CPC .............. *H04L 67/34* (2013.01); *H04L 67/12* (2013.01); *H04W 4/70* (2018.02)

(58) Field of Classification Search
USPC ........................................................ 717/173
See application file for complete search history.

(56) References Cited

U.S. PATENT DOCUMENTS

| | | | | |
|---|---|---|---|---|
| 5,835,594 | A * | 11/1998 | Albrecht | G06F 12/1466 713/187 |
| 6,631,474 | B1 * | 10/2003 | Cai | G06F 1/3203 713/300 |
| 7,461,374 | B1 * | 12/2008 | Balint | G06F 8/658 717/174 |
| 7,480,907 | B1 * | 1/2009 | Marolia | G06F 8/65 717/127 |
| 8,201,161 | B2 * | 6/2012 | Challener | G06F 9/4411 717/168 |
| 8,473,754 | B2 * | 6/2013 | Jones | G06F 21/53 713/190 |
| 8,489,898 | B2 * | 7/2013 | Wong | G06F 21/70 713/192 |
| 8,576,361 | B2 * | 11/2013 | Nam | G02F 1/133555 349/114 |
| 8,667,270 | B2 * | 3/2014 | Brutch | H04L 9/083 713/156 |
| 8,898,654 | B2 * | 11/2014 | Young | G06F 21/572 717/168 |
| 8,959,576 | B2 * | 2/2015 | Sastry | G06F 21/78 726/1 |
| 8,971,538 | B1 * | 3/2015 | Marr | G06F 8/65 380/285 |
| 8,972,966 | B2 * | 3/2015 | Kelso | G06F 8/65 717/169 |
| 9,218,178 | B2 * | 12/2015 | Young | G06F 8/65 |
| 9,235,403 | B2 * | 1/2016 | Flynn | G06F 21/572 |
| 9,246,690 | B1 * | 1/2016 | Roth | H04L 9/3268 |
| 9,251,336 | B1 * | 2/2016 | Semenzato | G06F 21/572 |
| 9,311,641 | B2 * | 4/2016 | Taveau | G06F 21/44 |
| 9,603,190 | B2 * | 3/2017 | Choi | H01L 29/2003 |
| 10,402,273 | B2 | 9/2019 | Olinsky et al. | |
| 2003/0009752 | A1 * | 1/2003 | Gupta | G06F 8/65 717/171 |
| 2004/0010702 | A1 * | 1/2004 | Lewis | G06F 12/1433 713/194 |
| 2005/0132351 | A1 * | 6/2005 | Randall | G06F 11/1433 717/168 |
| 2006/0075276 | A1 * | 4/2006 | Kataria | G06F 11/1433 714/47.1 |
| 2006/0273438 | A1 * | 12/2006 | Anderson | H01L 23/576 257/686 |
| 2007/0006208 | A1 * | 1/2007 | Nguyen | G06F 11/1433 717/168 |
| 2007/0073978 | A1 * | 3/2007 | Lee | G06F 8/65 711/141 |
| 2007/0089108 | A1 * | 4/2007 | Chen | G06F 8/65 717/168 |
| 2007/0169073 | A1 * | 7/2007 | O'Neill | G06F 8/61 717/168 |
| 2007/0169075 | A1 * | 7/2007 | Lill | G06F 8/61 717/168 |
| 2007/0198525 | A1 * | 8/2007 | Chatterjee | G06F 21/572 |
| 2008/0141240 | A1 * | 6/2008 | Uthe | G06F 8/61 717/174 |
| 2009/0064125 | A1 * | 3/2009 | Venkatachalam | G06F 21/85 717/170 |
| 2009/0282477 | A1 * | 11/2009 | Chen | G06F 21/51 726/22 |
| 2011/0131447 | A1 * | 6/2011 | Prakash | G06F 21/572 714/19 |
| 2012/0260244 | A1 * | 10/2012 | Keller | G06F 8/654 717/173 |
| 2012/0266155 | A1 * | 10/2012 | Valeriano | G06F 8/65 717/172 |
| 2013/0031374 | A1 * | 1/2013 | Thom | G06F 21/46 713/189 |
| 2013/0055335 | A1 * | 2/2013 | Chien | G06F 21/74 726/1 |
| 2014/0004825 | A1 * | 1/2014 | Prakash | G06F 21/74 455/411 |
| 2014/0007072 | A1 * | 1/2014 | Chhabra | G06F 8/65 717/171 |
| 2014/0066015 | A1 | 3/2014 | Aissi | |
| 2015/0039872 | A1 | 2/2015 | Jorden et al. | |
| 2015/0268952 | A1 * | 9/2015 | Ponsini | G06F 8/65 717/168 |
| 2015/0294112 | A1 * | 10/2015 | Pintiysky | G06F 9/455 726/24 |
| 2016/0004876 | A1 * | 1/2016 | Bye | G06F 21/604 726/27 |
| 2016/0134318 | A1 * | 5/2016 | Wane | H04W 4/60 455/558 |
| 2016/0179738 | A1 * | 6/2016 | Guddeti | G06F 11/3027 714/56 |
| 2016/0203026 | A1 * | 7/2016 | Simitsis | G06F 16/254 718/104 |
| 2016/0212174 | A1 * | 7/2016 | Raleigh | G06Q 10/06375 |
| 2016/0277933 | A1 * | 9/2016 | Moon | H04W 4/70 |
| 2016/0292423 | A1 * | 10/2016 | Yao | G06F 21/577 |
| 2016/0313987 | A1 * | 10/2016 | Son | G06F 8/65 |
| 2016/0337169 | A1 * | 11/2016 | Chhabra | H04L 41/0672 |
| 2016/0350543 | A1 * | 12/2016 | Kong | G06F 21/566 |
| 2016/0364223 | A1 * | 12/2016 | Vandikas | G06Q 20/3829 |
| 2016/0378996 | A1 * | 12/2016 | Smith | G06F 21/602 713/190 |
| 2017/0075677 | A1 * | 3/2017 | Gross | G01R 31/44 |
| 2017/0093861 | A1 * | 3/2017 | Kesavan | H04L 41/12 |
| 2017/0139777 | A1 * | 5/2017 | Gehrmann | G06F 11/1433 |
| 2017/0185781 | A1 * | 6/2017 | Kim | G09C 1/00 |
| 2017/0222815 | A1 * | 8/2017 | Meriac | H04L 9/3247 |
| 2017/0286668 | A1 * | 10/2017 | Shanahan | G06F 21/53 |
| 2017/0322790 | A1 * | 11/2017 | Surdu | G06F 21/105 |
| 2017/0364685 | A1 * | 12/2017 | Shah | G06F 21/53 |
| 2018/0041345 | A1 * | 2/2018 | Maim | G06Q 20/065 |
| 2018/0069707 | A1 * | 3/2018 | Loreskar | H04L 9/30 |
| 2018/0081666 | A1 * | 3/2018 | Surdu | G06F 21/572 |
| 2018/0081669 | A1 * | 3/2018 | Becker | H04L 63/083 |
| 2018/0165088 | A1 * | 6/2018 | Bonar | H04L 67/34 |
| 2019/0294503 | A1 | 9/2019 | Olinsky et al. | |

OTHER PUBLICATIONS

"A System-Wide Approach to Security", http://www.arm.com/products/security-on-arm/trustzone, Published on: Nov. 21, 2016, 6 pages. (Year: 2016).*

Acohido, Byron, "Securing the Internet of Things: 'Side channel attacks' expose sensitive data collected by IoT devices", http://thirdcertainty.com/featured-story/securing-the-internet-of-things-side-channel-attacks-expose-sensitive-data-collected-by-iot-devices /, Nov. 30, 2015, 4 pages. (Year: 2015).*

Maxfield, Clive, "Single-chip end-to-end security for IoT devices connected to the Amazon cloud", http://www.embedded.com/electronics-blogs/max-unleashed-and-unfettered/4442574/ Single-chip-end-to-end-security-for-IoT-devices-connected-to-Amazon-cloud, Aug. 18, 2016, 3 pages. (Year: 2016).*

(56) References Cited

OTHER PUBLICATIONS

Miller, Jeff, "Identifying the Prime Challenge of IoT Design", http://semimd.com/blog/2015/12/18/identifying-the-prime-challenge-of-iot-design/, Dec. 18, 2015, 6 pages. (Year: 2015).*

Namiluko, et al., "Towards Enhancing Web Application Security Using Trusted Execution", In Proceedings of the Workshop on Web Applications and Secure Hardware, Published on: Jun. 20, 2013, 9 pages. (Year: 2013).*

Ordman, Roger, "Efficient over-the-air software and firmware updates for the Internet of Things", http://embedded-computing.com/articles/efficient-software-firmware-updates-the-internet-things/, Published on: Apr. 10, 2014, 5 pages. (Year: 2014).*

"Secure software and firmware update", http://www.infineon.com/cms/en/applications/smart-card-and-security/internet-of-things-security/secure-software-and-firmware-update/, Retrieved on: Dec. 29, 2016, 6 pages. (Year: 2016).*

Silicon Labs Blue Gecko Bluetooth® Low Energy SoCs, http://www.mouser.in/new/Silicon-Laboratories/efr32bg-blue-gecko/, Retrieved on: Apr. 6, 2017, 2 pages. (Year: 2015).*

Wallace, Jim, "Securing the embedded IoT world," arm community, May 27, 2016, last retrieved from https://community.arm.com/developer/ip-products/system/b/embedded-blog/posts/securing-the-embedded-iot-world on Mar. 31, 2019, 12 pages. (Year: 2016).*

Yu, et al., "Handling a trillion (unfixable) flaws on a billion devices: Rethinking network security for the Internet-of-Things", In Proceedings of the 14th ACM Workshop on Hot Topics in Networks, Nov. 16, 2015, 7 pages. (Year: 2015).*

"Final Office Action Issued in U.S. Appl. No. 15/443,912", dated Oct. 30, 2019, 6 Pages.

"Final Office Action Issued in U.S. Appl. No. 15/629,622", dated Dec. 20, 2019, 13 Pages.

"Non Final Office Action Issued in U.S. Appl. No. 16/441,849", dated Oct. 1, 2020, 24 Pages.

\* cited by examiner

SECURE IOT DEVICE UPDATE

CROSS-REFERENCE TO RELATED APPLICATION(S)

This application is a continuation of U.S. patent application Ser. No. 15/444,024, filed Feb. 27, 2017, entitled "SECURE IOT DEVICE UPDATE," which claims priority to U.S. Provisional Pat. App. No. 62/434,308, filed Dec. 14, 2016, entitled "SECURE IOT DEVICE UPDATE". The entirety of each of these afore-mentioned application(s) is incorporated herein by reference.

BACKGROUND

The Internet of Things ("IoT") generally refers to a system of devices capable of communicating over a network. The devices can include everyday objects such as toasters, coffee machines, thermostat systems, washers, dryers, lamps, automobiles, and the like. The network communications can be used for device automation, data capture, providing alerts, personalization of settings, and numerous other applications.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to updating of applications, firmware and/or other software on IoT devices. In one example of the technology, at least one processor includes a first independent execution environment and a second independent execution environment. The first independent execution environment has at least one capability that the second independent execution environment does not have. A request that is associated with a requested update is communicated from a second independent execution environment of a first application processor to a first independent execution environment of the first application processor. The first independent execution environment validates the requested update. Instructions associated with the validated update are communicated from the first independent execution environment to the second independent execution environment. Image requests are sent from the second independent execution environment to a cloud service for image binaries associated with the validated update. The first independent execution environment receives the requested image binaries from the cloud service. The first independent execution environment writes the received image binaries to memory, and validates the written image binaries.

In some examples, the first independent execution environment is a secure world, and the second independent execution environment is a normal world.

In some examples of the disclosure, updates for IoT devices, including application updates, are accomplished by, among other things, writing binaries to flash memory. The IoT device includes an application processor that includes at least two independent execution environments including a secure world and a normal world. The normal world (NW) is responsible for managing updates, including communications over the network with the cloud service, but the NW is less trusted than the most secure environments in the IoT device. The SW monitors requests and validates requests before allowing access to flash. The NW cannot itself write to flash; instead the SW can write to flash on behalf of the NW after validation. Accordingly, while the NW operating system (OS) is in charge of managing updates, SW is ultimately responsible for managing update binaries.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
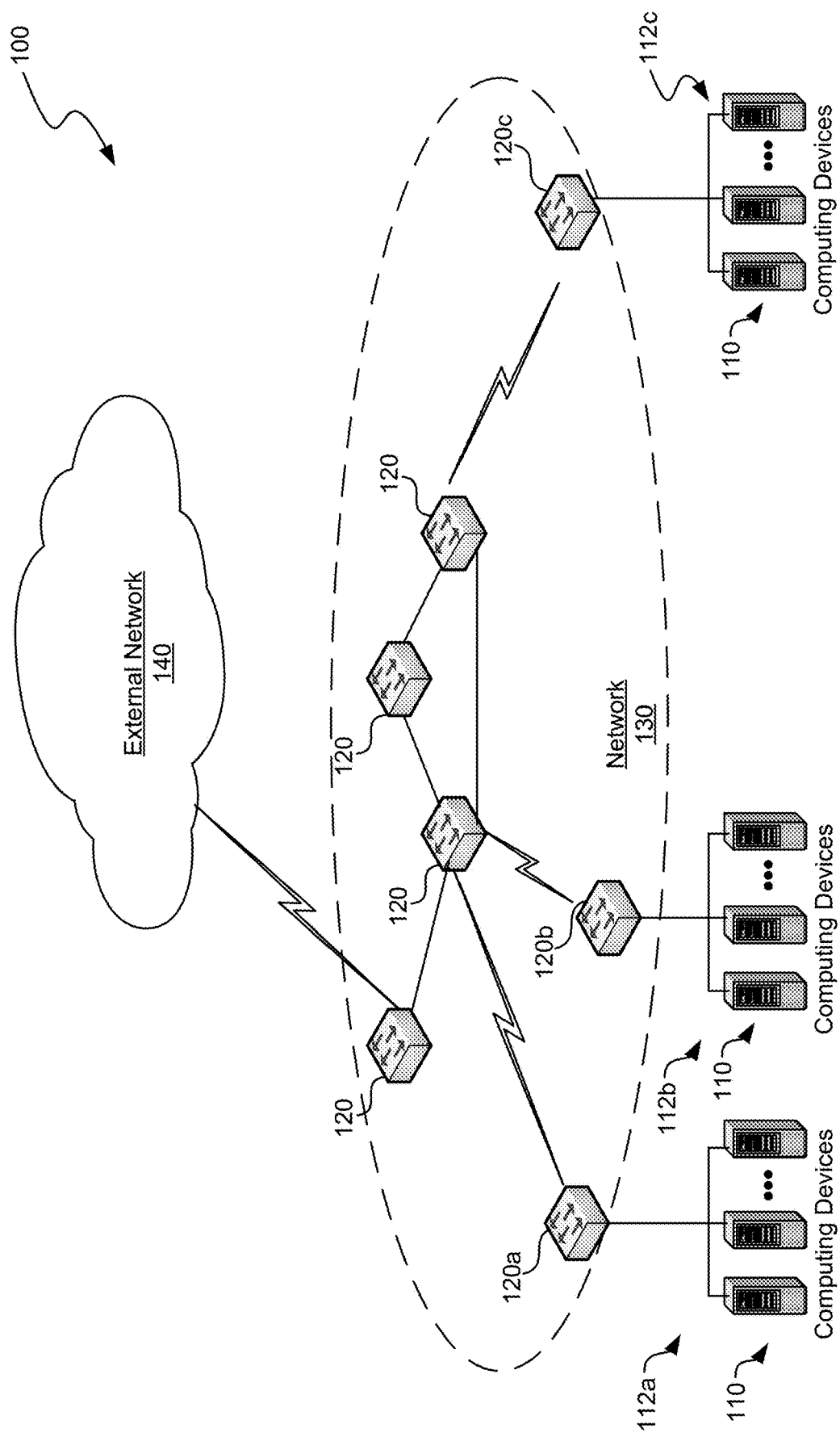
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof.

Briefly stated, the disclosed technology is generally directed to updating of applications, firmware and/or other software on IoT devices. In one example of the technology, at least one processor includes a first independent execution environment and a second independent execution environment. The first independent execution environment has at least one capability that the second independent execution environment does not have. A request that is associated with a requested update is communicated from a second independent execution environment of a first application processor to a first independent execution environment of the first application processor. The first independent execution environment validates the requested update. Instructions associated with the validated update are communicated from the first independent execution environment to the second independent execution environment. Image requests are sent from the second independent execution environment to a cloud service for image binaries associated with the validated update. The first independent execution environment receives the requested image binaries from the cloud service. The first independent execution environment writes the received image binaries to memory, and validates the written image binaries.

In some examples, the first independent execution environment is a secure world, and the second independent execution environment is a normal world.

In some examples of the disclosure, updates for IoT devices, including application updates, are accomplished by, among other things, writing binaries to flash memory. The IoT device includes an application processor that includes at least two independent execution environments including a secure world and a normal world. The normal world (NW) is responsible for managing updates, including communications over the network with the cloud service, but the NW is less trusted than the most secure environments in the IoT device. The SW monitors requests and validates requests before allowing access to flash. The NW cannot itself write to flash; instead the SW can write to flash on behalf of the NW after validation. Accordingly, while the NW operating system (OS) is in charge of managing updates, SW is ultimately responsible for managing update binaries.

Illustrative Devices/Operating Environments

FIG. 1 is a diagram of environment too in which aspects of the technology may be practiced. As shown, environment too includes computing devices 110, as well as network nodes 120, connected via network 130. Even though particular components of environment too are shown in FIG. 1, in other examples, environment too can also include additional and/or different components. For example, in certain examples, the environment too can also include network storage devices, maintenance managers, and/or other suitable components (not shown). Computing devices 110 shown in FIG. 1 may be in various locations, including on premise, in the cloud, or the like. For example, computer devices 110 may be on the client side, on the server side, or the like.

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112a-112c. In the illustrated example, each of host sets 112a-112c is operatively coupled to a corresponding network node 120a-120c, respectively, which are commonly referred to as "top-of-rack" or "TOR" network nodes. TOR network nodes 120a-120c can then be operatively coupled to additional network nodes 120 to form a computer network in a hierarchical, flat, mesh, or other suitable types of topology that allows communications between computing devices 110 and external network 140. In other examples, multiple host sets 112a-112c may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

In some examples, one or more of the computing devices 110 is an IoT device, a device that comprises part or all of an IoT hub, a device comprising part or all of an application back-end, or the like, as discussed in greater detail below.

Illustrative Computing Device

Figure 2:
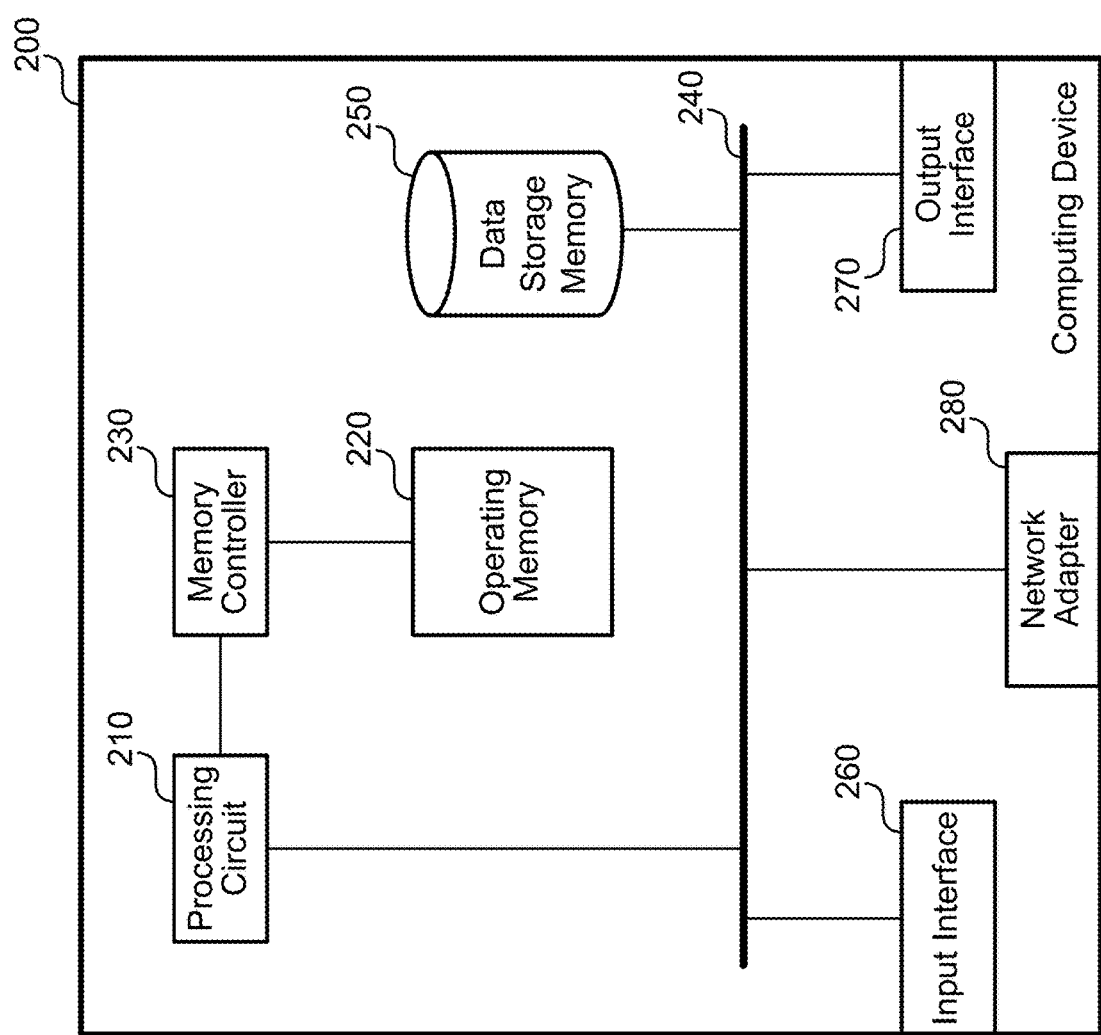
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Computing device 200 may also be an IoT device that connects to a network to receive IoT services. Likewise, computer device 200 may be an example any of the devices illustrated in or referred to in FIGS. 3-5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field-programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage media," throughout the specification and the claims whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing. In yet another example, input interface 260 and/or output interface 270 may include a universal asynchronous receiver/transmitter ("UART"), a Serial Peripheral Interface ("SPI"), Inter-Integrated Circuit ("I2C"), a General-purpose input/output ("GPIO"), and/or the like. Moreover, input interface 260 and/or output interface 270 may include or be interfaced to any number or type of peripherals.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Figure 5A:
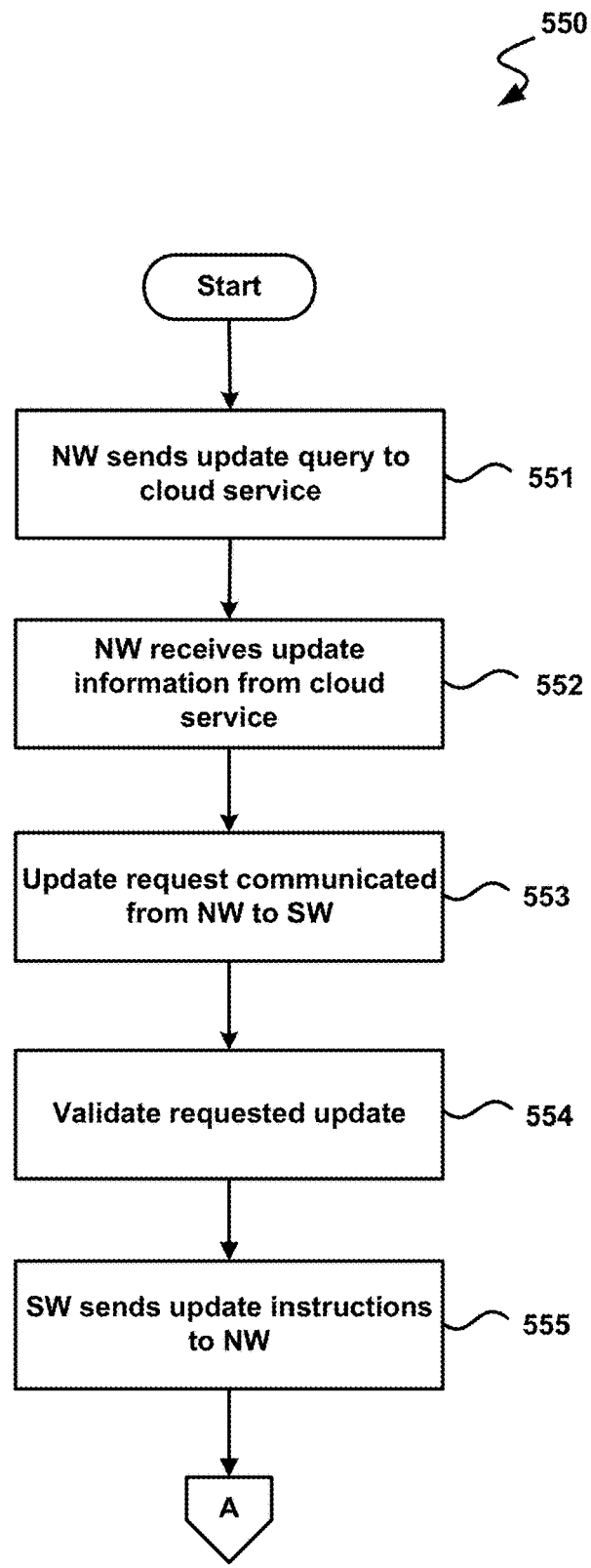
FIGS. 5A-5C are a logical flow diagram illustrating an example of a process for IoT devices updates, in accordance with aspects of the present disclosure.
Figure 5B:
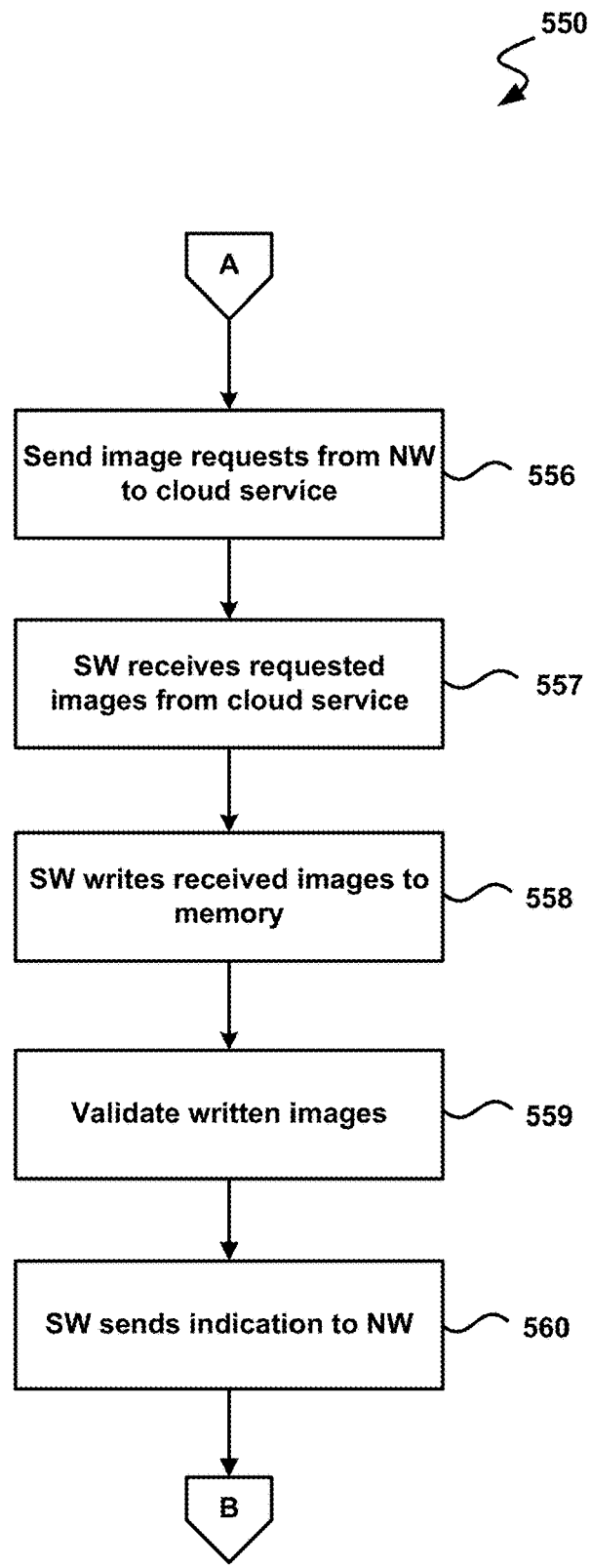
Figure 5C:
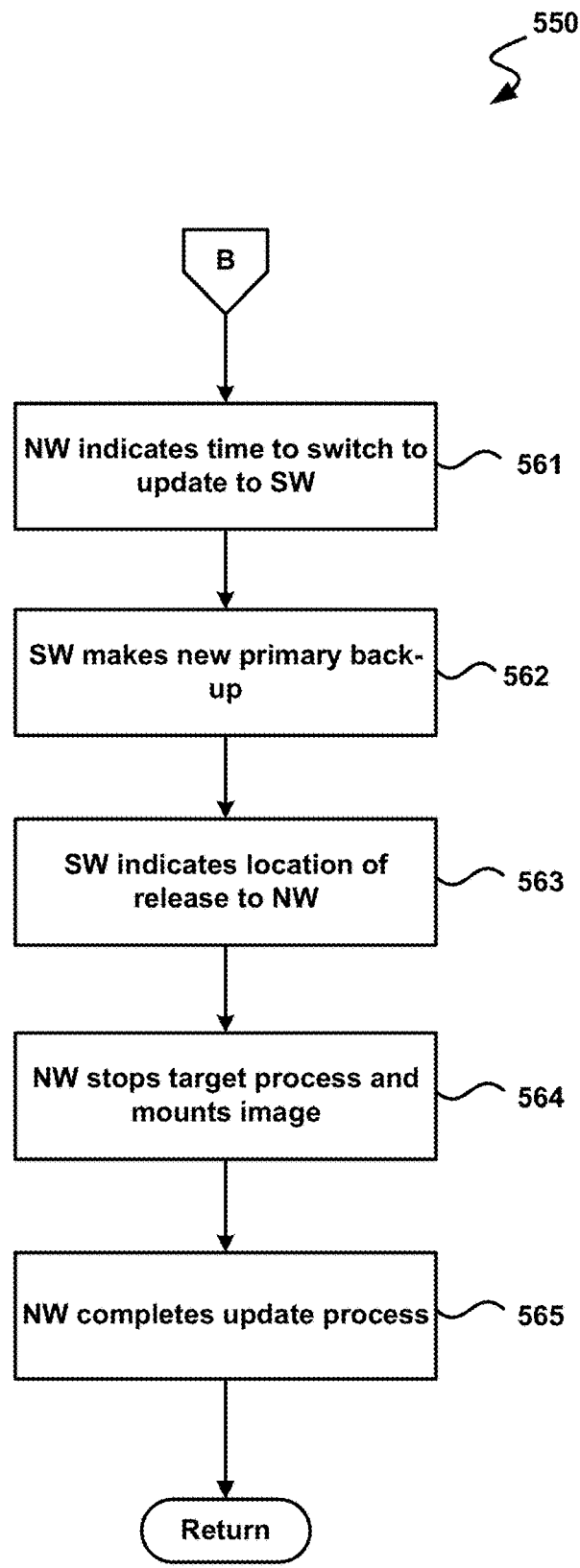

Some examples of computing device 200 include at least one memory (e.g., operating memory 220) adapted to store run-time data and at least one processor (e.g., processing unit 210) that is adapted to execute processor-executable code that, in response to execution, enables computing device 200 to perform actions, such as, for example, the actions of the process of FIGS. 5A-5C in some examples.

Illustrative Systems

Figure 3:
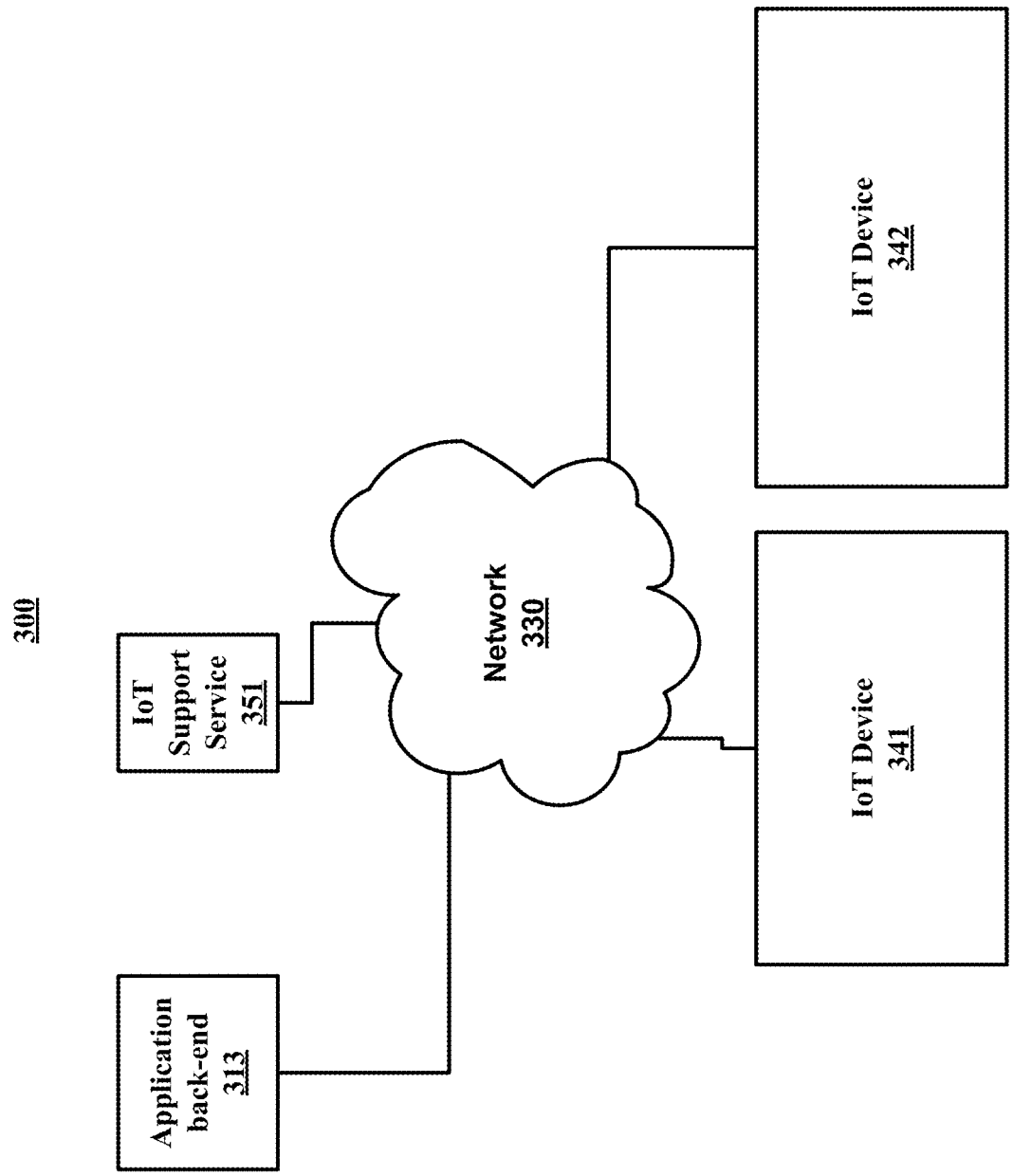
FIG. 3 is a block diagram illustrating an example of a system.

FIG. 3 is a block diagram illustrating an example of a system (300) for IoT data control. System 300 may include network 330, IoT support service 351, IoT devices 341 and 342, and application back-end 313, which all connect to network 330. The term "IoT device" refers to a device intended to make use of IoT services. An IoT device can include virtually any device that connects to the cloud to use IoT services, including for telemetry collection or any other purpose. IoT devices include any devices that can connect to a network to make use of IoT services. IoT devices can include everyday objects such as toasters, coffee machines, thermostat systems, washers, dryers, lamps, automobiles, and the like. IoT devices may also include, for example, a variety of devices in a "smart" building including lights, temperature sensors, humidity sensors, occupancy sensors, and the like. The IoT services for the IoT devices can be used for device automation, data capture, providing alerts, personalization of settings, IoT device updates, and numerous other applications.

Application back-end 313 refers to a device, or multiple devices such as a distributed system, that performs actions that enable data collection, storage, and/or actions to be taken based on the IoT data, including user access and control, data analysis, data display, control of data storage, automatic actions taken based on the IoT data, and/or the like. In some examples, at least some of the actions taken by the application back-end may be performed by applications running in application back-end 313.

The term "IoT support service" refers to a device, or multiple devices such as a distributed system, to which, in some examples, IoT devices connect on the network for IoT services. In some examples, the IoT support service is an IoT hub. In some examples, the IoT hub is excluded, and IoT devices communicate with an application back-end, directly or through one or more intermediaries, without including an IoT hub, and a software component in the application back-end operates as the IoT support service. IoT devices receive IoT services via communication with the IoT support service.

Each of the IoT devices 341 and 342, and/or the devices that comprise IoT support service 351 and/or application back-end 313 may include examples of computing device 200 of FIG. 2. The term "IoT support service" is not limited to one particular type of IoT service, but refers to the device to which the IoT device communicates, after provisioning, for at least one IoT solution or IoT service. That is, the term "IoT support service," as used throughout the specification and the claims, is generic to any IoT solution. The term IoT support service simply refers to the portion of the IoT solution/IoT service to which provisioned IoT devices communicate. In some examples, communication between IoT devices and one or more application back-ends occur with an IoT support service as an intermediary. The IoT support service is in the cloud, whereas the IoT devices are edge devices. FIG. 3 and the corresponding description of FIG. 3 in the specification illustrates an example system for illustrative purposes that does not limit the scope of the disclosure.

Network 330 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 330 includes any communication method by which information may travel between IoT support service 351, IoT devices 341 and 342, and application back-end 313. Although each device or service is shown connected as connected to network 330, that does not mean that each device communicates with each other device shown. In some examples, some devices/services shown only communicate with some other devices/services shown via one or more intermediary devices. Also, other network 330 is illustrated as one network, in some examples, network 330 may instead include multiple networks that may or may not be connected with each other, with some of the devices shown communicating with each other through one network of the multiple networks and other of the devices shown communicating with each other with a different network of the multiple networks.

As one example, IoT devices 341 and 342 are devices that are intended to make use of IoT services provided by the IoT support service, which, in some examples, includes one or more IoT support services, such as IoT support service 351. Application back-end 313 includes a device or multiple devices that perform actions in providing a device portal to users of IoT devices.

Device updates for IoT devices such as IoT devices 341 and 342 may occur at various times. For example, applications, firmware, and/or other software, on an IoT device may be updated. Updates may be communicated to the IoT devices (e.g., 341 and 342) from the IoT support service (e.g., IoT hub 351 or application back-end 313 or the like) via network 330. Device updates may be installed frequently in some examples.

System 300 may include more or less devices than illustrated in FIG. 3, which is shown by way of example only.

Illustrative Hybrid Chip

Figure 4:
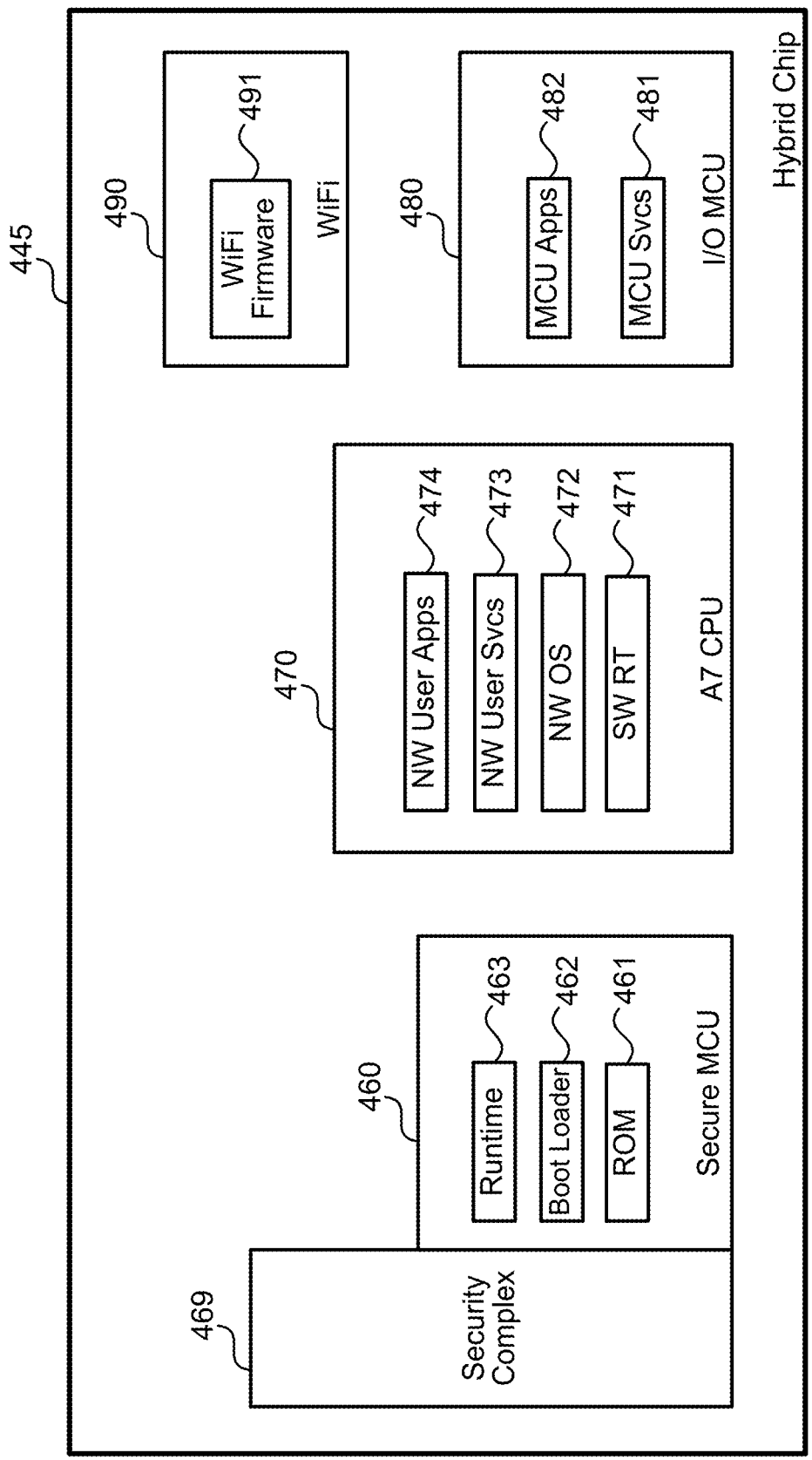
FIG. 4 is a block diagram illustrating an example of the hybrid chip of FIG. 3.

FIG. 4 is a diagram illustrating an example of a hybrid chip 445 with defense-in-depth architecture. FIG. 4 and the corresponding description of FIG. 4 in the specification illustrate an example process for illustrative purposes that do not limit the scope of the disclosure.

In some examples, hybrid chip 445 enables a device in which hybrid chip 445 is included to operate as an IoT device, such as IoT device 341 or 342 of FIG. 3. In some examples, hybrid chip 445 may have at least 4 MB of RAM and at least 4 MB of flash memory. In some examples, hybrid chip 445 provides not just network connectivity, but various other functions including hardware and software security, a monitored operating system, cryptographic functions, peripheral control, telemetry, and/or the like. In addition, hybrid chip 445 may include technology for allowing the device to be booted in a secure manner, allowing the device to be securely updated, ensuring that proper software is running on the device, allowing the device to function correctly as an IoT device, and/or the like.

Hybrid chip 445 is arranged as follows in some examples. Hybrid chip 445 includes core security complex 469, secure microcontroller (MCU) 460, general purpose CPU 470, at least one input/output (I/O) MCU 480, and core 490. Secure MCU 460 may include secure MCU read-only memory (ROM) 461, secure MCU first bootloader 462, and secure MCU runtime (RT) 463. CPU 470 may be an application processor that includes Secure World (SW) RT 471, Normal World (NW) operating system (OS) 472 that operates in supervisor mode, NW user-mode services 473, and NW user-mode applications 474. Each I/O MCU 480 may include MCU services 481 and MCU applications 482. core 490 may include Wi-Fi firmware 491. In some examples, core 480 is a CPU or an MCU dedicated to wireless communication.

In some examples, core security complex 469 is the hardware root of trust in hybrid chip 469. In some examples, core security complex 469 is directly connected to secure MCU 460. In some examples, secure MCU 460 has a very high degree of trust, but is less trusted than core security complex 469. In these examples, secure MCU 460 controls one or more functions that require a very high degree of trust. In one example, secure MCU 460 controls power for hybrid chip 454 and/or an IoT device.

In some examples, the SW execution environment 471 of the CPU core is also part of the trusted computing base of the system. For instance, in some examples, SW RT 471 has unfettered access to reprogram hardware protection mechanisms, such as firewalls in some examples. In some examples, SW RT 471 does not, however, have access to the internals of core security complex 469 and relies on the secure MCU 460 for its most security-sensitive operations.

The NW execution environment of the CPU core may be configured to have limited access to such on-chip resources as memories. In some examples, the code running in this environment must still meet certain (e.g., relatively high) standards of security and quality but is less trusted than either the code running on the secure MCU 460 or the code running in Secure World 471 on the CPU.

In some examples, the I/O MCU cores 480 are less trusted than the secure MCU 460 and CPU cores, and as such, in some examples the CPU core's Secure World environment is responsible for configuring the firewalls of hybrid chip 445 to limit the access of 480 I/O MCU to on-chip resources.

In some examples, core 490 executes vendor-provided firmware. The core 490 may provide Wi-Fi functionality and connectivity to the Internet and cloud services such as IoT services. In some examples, core 490 may provide communications via Bluetooth and/or other connectivity technology. But as with the I/O MCU cores 480, in some examples, the CPU 470 is responsible for configuring the firewalls to limit the access of core 490 to on-chip resources. In some examples, core 490 does not have any access to unencrypted secrets, and is not capable of compromising the execution of secure MCU core 460 or the CPU 470 core.

In some examples, each independent execution environment is managed by a single software component executing in a separate execution environment that is referred to the "parent" of the execution environment. In such examples, one exception may be that the hardware root of trust (core security complex 469 in this example) has no parent. In one particular example, each parent executes in an environment that is at least as trusted as the environments it manages. In other examples, other suitable means of security may be employed. Management operations may include booting and resuming the target environment, monitoring and handling resets in the target environment, and configuring access policy for the target environment. In some cases, certain management operations are performed by a component other than a parent. For instance, in some examples, CPU Normal World is the environment that manages I/O MCU cores 480, but receives assistance from CPU Secure World 471 to do so (e.g. to configure firewalls, and to program the starting instructions of the I/O MCU 480).

For instance, in some examples, secure MCU RT 473 manages CPU SW RT 472, a component in CPU SW RT 471 manages NW OS 472, a component in CPU NW OS manages NW user-mode 473 and 474, and NW user-mode services 473 manages the I/O MCU cores 480 and the core 490.

In some examples, not only are independent execution environments managed by a software component from a more trusted execution environment, but different functions are assigned to the different independent execution environments, with more sensitive functions assigned to more trusted independent execution environments. In one particular example, independent execution environments less trusted than the independent execution environment to which it is assigned are restricted from having access to the function. In this way, the independent execution environments achieve defense-in-depth based on a hierarchy of trust. In other examples, other suitable means of security may be employed.

For instance, in some examples, core security complex 469 is at the top of the hierarchy and is assigned to secrets (e.g., encryption keys), secure MCU RT 480 is next in the hierarchy and is assigned to controlling power, SW RT 471 is next in the hierarchy and is assigned to storage and to write access to a real time clock (RTC), NW OS 472 is next in the hierarchy and is assigned to Wi-Fi, NW user-mode applications 474 is next in the hierarchy and is assigned to applications, and the I/O MCU 480 cores are at the bottom of the hierarchy and are assigned to peripherals. In other examples, functions are assigned to independent execution environments in a different manner.

In some examples, each level of the hierarchy of trust except for the bottom (i.e., least trusted) level of the hierarchy has complete control to accept or reject any requests from a less trusted level, e.g., in terms of implementing support for the software they handle, and have the ability to rate limit or audit the requests from less trusted levels and to validate requests from lower levels to ensure that the requests correct and true. Also, as previously discussed, in some examples, each level of hierarchy except the top (i.e., most trusted) level has a parent that is responsible for managing the lower (i.e., less trusted) level, including monitoring the software of the lower level and ensuring that the software on the lower level is running correctly.

In some examples, the layers of the hierarchy make use of secure communications channels and firewalls. For instance, in some examples, secure MCU RT 471 has two message queues, configured such that, based on the hardware, one of the queues can only be used in SW, and one that can be used from NW. In one particular example, if a message comes from the SW queue, then based on the hardware the message must have come from the SW, and is therefore more trusted than a message that came from NW. In other examples, other suitable means of security may be employed.

Additionally, in some examples, apart from the highest layer of the hierarchy, no layer of the hierarchy starts without a higher level of the hierarchy having validated the layer and, after validating the layer, allowed the layer to start. Also, in these examples, a layer of the hierarchy has the ability to stop any lower level of hierarchy, for example, at any time. Accordingly, in these examples, hybrid chip 445 has the software capability of each layer of the hierarchy having complete dominance over lower (i.e., less trusted) levels of the hierarchy in terms of stopping and starting and running of the lower levels of the hierarchy.

In some examples, core security complex 469 is the hardware root of trust and the highest, most trusted level of the defense-in-depth trust hierarchy. In some examples, core security complex 469 contains keys, secrets, encryption engines, and/or the like. In some examples, core security complex 469 stores secrets, performs functions such as key generation, encryption, decryption, hashing, other cryptographic functions, other security-related functions, and/or the like. In some examples, core security complex 469 is able to check the secret value stored in a one-way writable memory such as an e-fuse, one time programmable element, and/or the like.

In some examples, when Hybrid chip 445 is powered on and its power management unit (PMU) has stable power, it releases the Core security complex 469 from reset. In some examples, the Core security complex 469 is at the core of Hybrid chip 445's trusted computing base. In some examples, core security complex 469 drives the secure boot process. In one particular example, cores are restricted from executing code until the Core security complex 469 has enabled it to do so. In other examples, other suitable means of security may be employed.

In some examples, the secure MCU 460 does not contain a memory management unit (MMU), but does contain a memory protection unit (MPU) that can be used to provide some safeguards-such as controlling the readability, writability, and executability of portions of the physical address space. The MPU may be used in this fashion, e.g. marking stacks and memory-mapped flash as no-execute.

In some examples, secure MCU ROM 461 is responsible for initializing enough of hybrid chip 445 so that the first piece of software stored in flash can securely execute on the secure MCU 460.

In some examples, upon entry, the ROM code on secure MCU ROM 461 waits for indication that the secure MCU 460 has completed initialization, reads the e-fuse indicating the device's security state, configures Phase Locked Loops (PLLs) to set the desired steady-state, chip frequency, and enables memory mapping of flash (for all cores). In some examples, although the secure MCU core 460 does not execute code directly from flash, it does leverage this mechanism to easily read and copy data from flash to its SRAM.

In these examples, after it has completed this configuration, the ROM code is responsible for loading and transferring control to secure MCU-boot loader 462, which is the first-level boot loader of secure MCU 460. In some examples, secure MCU-boot loader 462 is found in flash, both encrypted and signed, at known locations. In these examples, the ROM code validates the code, and loads it into the private SRAM of secure MCU 460. In some examples, secure MCU-boot loader 462 contains the first instruction of non-ROM code executed on Hybrid chip 445, and is a fixed size (e.g., 16*k*) raw binary. In some examples, secure MCU-boot loader 462 is responsible for loading, validating, and transferring control to the secure MCU Runtime 463, setting up the device's software key store, implementing a low-level "recovery mode" for re-programming flash (used for development purposes, and possibly also for in-the-field updates-appropriately secured), applying updates/rollbacks, and configuring and kicking a secure watchdog timer in secure MCU 460 (until the secure MCU-RT 463 takes control).

Much like the ROM code before it, in these examples, secure MCU-boot loader 462 locates the secure MCU-RT code in flash, validates the code, loads the code into the private SRAM of secure MCU 460, and transfers control to the code. In some examples, once secure MCU boot loader 462 has transferred execution in this way, secure MCU-boot loader 462 will not regain control, and secure MCU-boot loader 462 will not remain resident in the SRAM of secure MCU 460 after secure MCU-boot loader 462 has finished executing.

In some examples, secure MCU runtime 463 is responsible for managing the CPU SW environment. In some examples, secure MCU is also responsible for managing and controlling power domains and other critical components, e.g., properly setting up debug enabling signals for other cores, powering on or off different domains on Hybrid chip 445, re-configuring and kicking the own watchdog timer of secure MCU 460 (taking over for secure MCU-boot loader), configuring the watchdog timer of CPU 470 and responding to its reset interrupt, and waking up a core (CPU 470 or I/O MCU 480) that has been powered off but received an interrupt. In some examples, secure MCU RT 463 is responsible for monitoring SW RT 471 of the CPU 470 to ensure that SW RT 471 is running correctly and to reset SW RT 471.

Secure MCU RT 463 interacts with core security complex 469 to request that core security complex 469 perform tasks associated with core security complex 469. For instance, secure MCU RT 463 may request security complex 469 to extract keys, or to request that core security complex 469 do something with the extracted keys, to request that core security complex 469 generate a pin number, to request that something be encrypted by core security complex 469 and the encrypted version returned to secure MCU RT 463, and/or the like. In some examples, secure MCU RT 463 acts in essence as the operating system for core security complex 469.

The CPU 470 may be configured such that Secure World on the CPU 470 has a trust zone that creates a private independent execution environment that is hardware-protected from the rest of hybrid chip 445. Secure World may have a runtime, Secure World runtime 471. In some examples, the Secure World (SW) environment on the CPU 470 is part of Hybrid chip 445's trusted computing base, and as such does not execute third-party code. For example, the SW may have its own kernel and user mode processes. SW RT 471 may be responsible for protecting security-sensitive hardware resources on Hybrid chip 445, safely exposing limited access to these resources, and acting as a watchdog for the CPU's Normal World (NW) environment 472-474. For instance, in some examples, SW RT 471 is responsible for monitoring NW OS 472, ensuring the NW OS 472 is running correctly, and resetting NW OS 472. The Normal World (NW) environment on the CPU 470 may host NW OS 472, NW user-mode services 473, and NW user-mode applications 474. In some examples, SW RT 471 is responsible for forwarding requests to secure-MCU 463 RT from layers that do not have access to secure-MCU 463 rt.

In some examples, the CPU core 470 does not contain ROM code; instead, CPU core 470 contains an 8-byte volatile memory that contains the first instruction(s) for it to execute upon being taken out of reset. In these examples, before the CPU 470 is taken out of reset, the 8-byte volatile memory is programmed by the secure MCU 460 to contain a branch to the first instruction of the CPU SW RT 471, executing from shared SRAM. In some examples, CPU 470 is configured such that the code that executes in Secure World RT 471 executes from a range of SRAM that is configured to be inaccessible to Normal World 472-474.

In some examples, SW RT 471 is also responsible for booting Normal World 472-474 on the CPU 470, exposing runtime services to software running in Normal World 472-474, access to real-time clock (RTC), I/O MCU 480 management API, N9 490 management API, managing silicon components not accessible to Normal World 472-474 (and which do not need to be managed by the secure MCU 460), interacting with the flash controller in macro mode, programming CPU SW 471 DMA engine, configuration of all firewalls, configuration of the core I/O mapping, handling interrupts indicating firewall violations, taking I/O MCU 480 and N9 490 cores out of reset, configuring watchdog timers for I/O MCU 480 cores, and configuring the Real-time clock (RTC). Because Secure World also contains multiple hardware modes (i.e. supervisor mode, user mode), the SW RT 471 may internally span multiple modes for additional defense-in-depth.

As discussed, in some examples, the SW environment of CPU 470 is a hardware-protected private execution environment of CPU 470. The rest of the software environment of CPU 470, other than the SW environment, is the NW environment. There are registers that the SW can read but the NW cannot in some examples. The NW environment may include a supervisor mode and a user mode. The supervisor mode of the NW environment of CPU 470 may include NW OS 472. The user mode of the NW environment of CPU 470 may include NW user-mode services 473 and NW user-mode applications 474.

In some examples, NW OS 472 is responsible for managing the resources for NW user-mode applications 474. In some examples, NW OS 472 is responsible for managing Wi-Fi, and layers hierarchically below (i.e., less trusted than) NW OS 472 do not have direct access to Wi-Fi, but can only access Wi-Fi indirectly via NW OS 472.

In some examples, in CPU NW user-space, a set of runtime services 473 are run that are responsible for: booting I/O MCU cores 480 (with assistance from SW RT 471), booting the core 490 (with assistance from SW RT 471), publishing device telemetry to IoT services, publishing diagnostic information to IoT services, receiving and applying software updates from IoT services, and handling reset interrupts from I/O MCU 480 watchdog timers.

In some examples, the CPU Device API internally leverages NW user-mode Runtime Services 473, and abstractly provides third-party Application Code hosted on the CPU (in NW) with access to the following functionality: publishing device telemetry, publishing diagnostic information, communicating with I/O MCU cores 480, controlling and issuing I/O to peripheral, and Application Code. In some examples, product manufacturers and other customers of hybrid chip 445 may author third-party code to execute on the CPU core in NW. In some examples, the application code is able to use the CPU Device API, and may coordinate with I/O runtimes executing on I/O MCU cores 480.

In some examples, hybrid chip 445 contains two "I/O" MCU cores 480 intended for use by customers, for sensing and actuation. In some of these examples, neither I/O MCU core 480 contains any ROM code. Instead, in these examples, each I/O MCU core 480 contains an 8-byte volatile memory mapped at a particular physical address. When an I/O MCU 480 core starts executing, it may fetch its initial instructions from this address. Before each I/O MCU core 480 is taken out of reset, the 8-byte volatile memory may be programmed by the CPU 470 to contain a branch to the first instruction of an I/O MCU Loader, XiP from flash.

In some examples, a company can use the I/O MCU core 480 microcontrollers to include the code that is on their existing microcontrollers, which may allow a company to replace their existing microcontroller functionality with hybrid chip 445.

In some examples, hybrid chip 445's Wi-Fi stack executes on core 490 programmed by the silicon vendor producing the chip.

While FIG. 4 illustrates a particular example of hybrid chip 445, many other examples of hybrid chip 445 are possible. For instance, the number and type of independent execution environments may vary in different examples. Hybrid chip 445 has at least two general purpose cores with differing capabilities, so that hybrid chip 445 has heterogeneous cores. The at least two general purpose cores with differing capabilities may be at least a microcontroller and a CPU in one example, while other general purpose cores with different capabilities are used in other examples. The two cores are general purpose in that any suitable code can be run on the cores. For example, the microcontroller and the CPU are general purpose cores, whereas a graphic processing unit (GPU) is not a general-purpose core; rather, a GPU is used to process very specific types of calculates, and can only run certain types of executions. While the two cores in hybrid chip 445 are both general purpose and each can run any suitable code, they have differing capabilities from each other. Although the CPU and the microcontroller are both general-purpose cores, the CPU is significantly more powerful than the microcontroller and can execute instructions that the microcontroller cannot. This is but one example of two general purpose cores with differing capabilities. While specific cores are discussed herein, such as the CPU and the MCU, in other examples, other general purpose cores may be employed such as any general purpose CPU, microcontroller, or the like. Also, various quantities of cores may be employed in various examples.

Also, in various examples, different functions may be assigned to different levels of the hierarchy. For instance, in the example of hybrid chip 445 illustrated in FIG. 4, the function of controlling power is assigned to a more trusted level of the hierarchy than the function of managing storage. However, in other examples, the function of managing storage is assigned to a more trusted level of the hierarchy than the function of controlling power.

While various example of hybrid chip 445 have been discussed in details, in some examples, an IoT device without such a hybrid chip is used. For instance, some example IoT devices include an application processor having a secure world and a normal world, but do not include any microcontrollers, or include some but not all of the microcontrollers illustrated in FIG. 4 (e.g. secure MCU 460 and/or I/O MCU cores 480). In some examples, a security complex is included in a type of core other than an MCU. Some example IoT devices include a security complex and an MCU, but do not include a CPU. In some of these examples, some of the functionality discussed for the CPU above are instead done in the MCU, and the SW and the NW may reside in the MCU. Other examples may include two cores include a secure MCU, and a second core that is a CPU or another CPU, in which case the secure MCU acts as the SW, and the second core acts as the NW. Also, while the IoT device includes some means of network communication, various examples of the IoT device may include any suitable means of network communication, and some examples do not include the N9 WiFi core 490 illustrated in FIG. 4.

While FIG. 4 and the corresponding discussion specifically involve a SW and a NW, more broadly, in other examples, there are two independent execution environments in which one of two independent execution environments is more trusted than the other. The more trusted independent execution environment is more secure, and has more capabilities than the less trusted independent execution environment. For example, the more trusted independent execution environment may have access to resources that the less trusted independent execution environment does not. In examples given above and below discussing the secure world and the normal world, more broadly, such statements may be extended to refer to a more trusted independent execution environment and a less trusted independent execution environment.

For instance, in some examples, the more trusted independent execution environment may be a secure MCU, such as secure MCU 460, and the less trusted independent execution environment may be a CPU, for example, CPU 470.

Device updates for IoT devices may occur frequently. For example, applications, firmware, and/or other software on IoT devices may be updated. An update may be composed of a set binaries that are referred to as images or image binaries. In some examples, each image binary has an associated image metadata. In some examples, the image metadata may include the name of the image, version of the image, signature, and/or the like. In some examples, the image metadata is stored in the cloud, e.g., making it queryable.

In some examples, the image metadata is also embedded into the image binary itself, ensuring that any image binary is self-describing. This might be implemented by uploading the metadata as a separate file, with the service repackaging the image binary and metadata together. Alternatively, the metadata might be pre-packed inside of the image binary, and unpackaged by the service.

A hardware stock keeping unit (SKU) is used in some examples as part of the process of describing hardware update policy and allowing its efficient implementation. In some examples, hardware SKUs are not a unique identifier of a single chip or device. Rather, in these examples, the hardware SKU uniquely identifies a particular configuration (color, model, capabilities, country etc.) in which a device is sold. In one example, the hardware SKUs for each IoT device include a device SKU and a chip SKU. In some examples, there may be more than two descriptive SKUs such that three or more types of SKUs provide a hierarchy of three or more levels. The chip SKU may define the particular type of hybrid chip that is running within the IoT device and the capabilities of the hybrid chip. A serial number, public key, or device ID may be used to uniquely identify a single instance of a chip.

The device SKU may be used as an identifier that describes a type of device that uses a hybrid chip. The SKU might be the SKU used by a product manufacturer that identifies a particular model and configuration in its product line. Each device SKU may have a set of attributes that describe features that are software dependent. In addition, every device SKU may have an attribute describing a unique chip SKU that all devices with this device SKU contain. These attributes may also be defined and stored in the IoT service solution within the SKU registries. The attributes may also describe features that the manufacturer uses to differentiate models from one another (i.e., washer vs dryer, tan vs. stainless steel), but also small differences (the hardware SKU for the motor used, the type of LED panel connected to the 4×4 chip) that compose the device. In some examples, there are two SKU registries; one registry for device SKUs and another registry for chip SKUs.

A release describes binary content that can be made available to a device. In some examples, a release is composed of at least four different entities: a set of image binaries, a single SKU, a component ID, and a semantic version. In some examples, each IoT device has two different releases installed on it. In some examples, a component ID collects all images that apply to a single component.

In some examples, releases are not made available to devices until they are deployed. In some examples, deployments bundle a set of releases with a set of constraints defining the properties of devices the deployment is intended for. In some examples, after a deployment is registered and activated, it is included in queries when ultimately calculating which releases are intended for a device.

In some examples, to begin the update process, a software engineer registers and uploads new image binaries from a local machine to an IoT update service associated with the IoT support service for the IoT devices. In some examples, the uploaded image binaries should be signed, e.g., because the image binaries will only be validated if the image binaries are signed. In some examples, image signing allows each image binary to be authenticated as being signed by a trusted entity.

In some examples, the software engineer may also define new releases around a particular SKU and register them with the IoT update service. The engineer may also be able to increment the release version number, compose a set of image binaries for the next version of a release, confirm that the composed image binaries meet all of the constraints provided by each image's metadata, and receive suggestions for constraint-compatible image binaries. For any given release, the software engineer may be able to use query tools to see the set of devices for which the release is currently used, used as a backup, or made available. Further, the engineer may be able to query a particular device group and determine which set of deployments and releases the group is currently using.

Once a new release is defined, an engineer may target that release at a set of machines by defining a deployment. An engineer may target a single SKU (across releases), or target all SKUs that are dependent on an image binary that was recently updated. After a deployment is activated it may be made available to IoT devices when the IoT devices next check for updates. In the normal case an IoT device may make a request for services to send it which releases it should currently have on some regular cadence (e.g., weekly). The engineer may also proactively request devices immediately make this request rather than on the regular cadence.

In some examples, when a release is made available to a group of IoT devices via a deployment, it will not be made available to all IoT devices in the group simultaneously. Instead, in these examples, each release is made available in a rolling deployment. A rolling deployment starts by deploying to a small subset of targeted IoT devices. As updates complete successfully, the number of IoT devices eligible for deployment increases.

An example of a process for updating an IoT device is shown in FIGS. 5A-5C.

FIGS. 5A-5C are a logical flow diagram illustrating an example of a process (550) for IoT devices updates. In one example, process 550 is performed by an IoT device. In various examples, process 550 may include more or less steps than shown. The particular example of process 550 shown in FIGS. 5A-5C and discussed herein is by way of example only, with numerous variations within the scope of the disclosure. The specific example illustrated in FIGS. 5A-5C show an example of updating an application. Other examples, such as examples in which an OS image is being updated, may vary from specific examples illustrated in FIG. 5A-5C.

After a start block, the process proceeds to block 551. At block 551, in some examples, a NW OS (e.g., NW OS 472 of FIG. 4) on an application processor (e.g., application processor CPU 470 of FIG. 4) on an IoT device includes a daemon that sends a query to a cloud service (e.g., IoT support service) as to whether or not there is a currently available new device update for the IoT device. The process then proceeds to block 552. At block 552, the NW daemon on the IoT device may receive, from the cloud service, information related to an update for the IoT device. In some examples, the information includes an indication of the release that the IoT device should be on, and includes metadata associated with the indicated release, such as the semantic version, and metadata associated with each image binary in the indicated release such as an ID, a version, and the like. In some examples, secure transmission is used in the communication between the IoT device and the cloud service.

The process then advances to block 553, where a request that is associated with a requested update is communicated from the NW to the SW. For instance, in some examples, the NW makes a request associated with the update, and the request is passed from the NW OS (e.g., NW OS 472 of FIG. 4) to the SW OS (e.g., SW RT 471 of FIG. 4). The process then proceeds to block 554, where the the requested update is validated, e.g., because the SW OS might not trust the NW OS. At block 554, in some examples, the SW validates the update by the SW validating that the update is properly signed. In some examples, the IoT device also confirms whether a new version should be downloaded by comparing the image binaries to be installed for the update against what is already installed in the IoT device. In some examples, security complex 469 validates the update, instead of the SW, or in conjunction with the SW.

The process then moves to block 555. At block 555, instructions associated with the validated update are communicated from the SW to the NW. For instance, in some examples, SW sends NW instructions on which image binaries should be downloaded from the cloud service (to ultimately be installed as part of the update process). The process then advances to block 556. At block 556, for image binaries associated with the validated update, image requests are sent from the NW to the cloud service. For instance, in some examples, for each image binary that the SW instructed, e.g., at block 555, to be downloaded from the cloud service, the NW daemon sends a corresponding request to the cloud service to download the image binary. In some examples, the cloud service sends to the NW daemon the location of each download in response to a request for the location of each image binary, and then the NW daemon sends requests to the indicated locations to download each image binary.

The process then advances to block 557. At block 557, the SW receives the requested image binaries from the cloud service. In some examples, there is insufficient RAM on the IoT device to storage the image binaries in memory, and so instead each image binary is streamed to the SW. In some examples, secure transmission is used between the cloud service and the IoT device. The process then proceeds to block 558. At block 558, the SW writes the receives image binaries to memory. In some examples, the SW writes the received image binaries to flash memory.

The process then moves to block 559. At block 559, the written image binaries are validated. For instance, in some examples, the SW validates each image binary written into flash memory by comparing, for each image binary, the signature on the image binary with the corresponding signature indicated in the metadata for the image binary. In this way, in these examples, the SW confirms that the SW downloaded the image binary that the SW instructed should be downloaded. In some examples, security complex 469 validates the written image binaries, instead of the SW, or in conjunction with the SW.

The process then advances to block 560. At block 560, in some examples, the SW indicates to the NW daemon that the download is complete (and that the written image binaries have been validated). The process then proceeds to block 561. At block 561, in some examples, the NW daemon determines when to switch to the updated release, and, at the determined time, indicates to the SW to switch the (validated) updated release. The process then moves to block 562. At block 562, in some examples, the SW makes the downloaded set of binary images the new primary back-up. The process then advances to block 563. At block 563, in some examples, the SW indicates the location of the (validated) new updated release to the NW daemon.

The process then proceeds to block 564. At block 564, in some examples, the NW daemon stops the target process and mounts the image binary. The process then moves to block 565. At block 565, the NW completes the update process. Block 565 may include functions such as restarting, verifying that the update was successful, notifying the cloud service that the update was successful, and/or other suitable functions. The exact process of completing the update may vary based on, for example, the execution domain of the software or firmware that is being updated. The process then advances to a return block, where other processing is resumed.

As discussed above, FIGS. 5A-5C illustrated a particular example for updating an application. Other updates, such as for an OS, may be performed in a similar manner, except, in some examples, the NW is not involved in the process, or is notified but it not otherwise involved. In some examples in which the NW is not involved in the update, the SW may update the security complex, SW OS, and/or the NW OS without the NW or the I/O MCUs being involved in the update process.

Also, as discussed above, while FIGS. 5A-5C give specific examples that include a SW and a NW world, more broadly the process may apply to a more trusted independent execution environment and a less trusted independent execution environment.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. An apparatus for updating, comprising:
an IoT device including a first memory adapted to store run-time data for the IoT device, and at least one processor that is adapted to execute processor-executable code that, in response to execution, enables at least a first independent execution environment and a second execution environment, wherein the first independent execution environment has at least one capability that the second independent execution environment does not have, wherein the second independent execution environment is a normal world of an application processor that is configured to manage updates, wherein the first independent execution environment is a secure world of the application processor, wherein the first independent execution environment is adapted to at least one of perform firewall configurations, monitor the normal world of the application processor, reset the normal world of the application processor, or control access of the normal world of the application processor to a second memory, and wherein the processor-executable code that, in response to execution, also enables actions, the actions including:
communicating a request for a requested update from the second independent execution environment to the first independent execution environment;
validating, by the first independent execution environment, the requested update;
communicating instructions associated with the validated update from the first independent execution environment to the second independent execution environment;
for update binaries associated with the validated update, sending update requests from the second independent execution environment to a cloud service;
receiving, by the first independent execution environment, the requested update binaries from the cloud service;
using the first independent execution environment to write the received update binaries to the second memory;
validating, by the first independent execution environment, the written update binaries; and
in response to validating the written update binaries, enabling, by the first independent execution environment, access by the second independent execution environment to the validated written update binaries.

2. The apparatus of claim 1, wherein the application processor is further configured such that validating the requested update includes: determining whether the requested update is properly signed; and comparing update binaries associated with the requested update with already installed update binaries.

3. The apparatus of claim 1, wherein the application processor is further configured such that validating the written update binaries includes comparing signatures associated with the update binaries with corresponding signatures stored in metadata associated with the update binaries.

4. The apparatus of claim 1, wherein the first memory and the application processor are part of a hybrid chip on the IoT device, and wherein the hybrid chip further includes a microcontroller that is configured to control network connectivity between the IoT device and IoT services.

5. The apparatus of claim 1, wherein the application processor is further configured such that communicating instructions associated with the validated update from the secure world to the normal world includes communicating, from the secure world to the normal world, an indication as to which update binaries should be installed as part of the validated update.

6. The apparatus of claim 1, wherein the application processor is further configured such that the secure world has a trust zone that creates a private independent execution environment that is hardware-protected from the rest of the IoT device.

7. The apparatus of claim 6, wherein the second memory is a flash memory, and wherein the application processor is configured such that the secure world has write access to the flash memory and such that the normal world is prevented from writing to the flash memory.

8. A method for updating, comprising:
communicating, in at least one processor that executes a first independent execution environment and a second independent execution environment, wherein the first independent execution environment has at least one capability that the second independent execution environment does not have, a request for a requested update from a second independent execution environment of a first application processor to the first independent execution environment of the first application processor, wherein the first independent execution environment is configured to monitor the second independent execution environment;
validating, by the first independent execution environment, the requested update;
communicating instructions associated with the validated update from the first independent execution environment to the second independent execution environment;
for update binaries associated with the validated update, sending update requests from the second independent execution environment to a cloud service;
receiving, by the first independent execution environment, the requested update binaries from the cloud service;
using the first independent execution environment to write the received update binaries to memory;
validating, by the first independent execution environment, the written update binaries; and
responsive to validating the written update binaries, the first independent execution environment enabling access by the second independent execution environment to the validated written update binaries.

9. The method of claim 8, wherein validating the requested update includes: determining whether the requested update is properly signed; and comparing update binaries associated with the requested update with update binaries already installed.

10. The method of claim 8, wherein validating the written update binaries includes comparing signatures associated with the update binaries with corresponding signatures stored in metadata associated with the update binaries.

11. The method of claim 8, wherein the second independent execution environment is a normal world.

12. The method of claim 8, further comprising receiving, by the second independent execution environment, information associated with whether a new update is currently available.

13. The method of claim 8, further comprising:
communicating from the first independent execution environment to at least one of the second independent execution environment or a security complex that the written update binaries have been validated.

14. The method of claim 8, further comprising:
communicating from at least one of a security complex or the second independent execution environment to the first independent execution environment an indication to switch to the validated update.

15. The method of claim 8, further comprising:
communicating from the first independent execution environment to at least one of the second independent execution environment or a security complex a location of the validated update.

16. The method of claim 8, wherein communicating instructions associated with the validated update from the first independent execution environment to the second independent execution environment includes communicating, from the first independent execution environment to the second independent execution environment, an indication as to which update binaries should be installed as part of the validated update.

17. The method of claim 16, wherein sending update requests from the second independent execution environment to the cloud service includes sending, for update binaries that the first independent execution environment indicated should be installed as part of the validated update, update requests associated with the update binaries to the cloud service.

18. A processor-readable storage medium, having stored thereon processor-executable code that is configured to, upon execution by at least one processor, enable a first independent execution environment and a second execution environment, wherein the first independent execution environment has at least one capability that the second independent execution environment does not have, and wherein the first independent execution environment is configured to monitor the second independent execution environment, and wherein the processor-executable code is further configured, in response to execution, to enable actions, the actions including:
communicating a request that is associated with a requested update from the second independent execution environment to the first independent execution environment;
validating, by the first independent execution environment, the requested update;
communicating instructions associated with the validated update from the first independent execution environment to the second independent execution environment;
for binaries associated with the validated update, sending update requests from the second independent execution environment to a cloud service;
receiving, by the first independent execution environment, the requested binaries from the cloud service;
using the first independent execution environment to write the received binaries to memory; and
validating, by the first independent execution environment, the written binaries.

19. The processor-readable storage medium of claim 18, wherein the processor-executable code is further configured such that validating the requested update includes: determining whether the requested update is properly signed; and comparing binaries associated with the requested update with binaries already installed.

20. The processor-readable storage medium of claim 18, wherein the processor-executable code is further configured such that validating the written binaries includes comparing signatures associated with the binaries with corresponding signatures stored in metadata associated with the binaries.

* * * * *